United States Patent [19]
Perego

[11] Patent Number: 5,806,784
[45] Date of Patent: Sep. 15, 1998

[54] CASSETTE WASTE TAPE RELOADER

[75] Inventor: Luciano Perego, Milan, Italy

[73] Assignee: Tapematic U.S.A., Inc., Orlando, Fla.

[21] Appl. No.: 847,891

[22] Filed: Apr. 28, 1997

Related U.S. Application Data

[63] Continuation of Ser. No. 528,602, Sep. 15, 1995, abandoned, which is a continuation of Ser. No. 145,334, Oct. 29, 1993, abandoned.

[30] Foreign Application Priority Data

Oct. 30, 1992 [IT] Italy .................................. MI92A2505

[51] Int. Cl.$^6$ ........................... B65H 19/28; B65H 35/00; B65H 35/08; B31F 5/00
[52] U.S. Cl. ..................................... 242/532.1; 242/523.1; 242/526; 242/554.2; 156/505
[58] Field of Search ................................... 242/523.1, 527, 242/527.5, 532.1, 534, 526, 563, 554.2; 156/505

[56] References Cited

U.S. PATENT DOCUMENTS

| | | | |
|---|---|---|---|
| 3,737,358 | 6/1973 | King | 242/527.5 X |
| 4,497,454 | 2/1985 | Woodley | 242/532.1 X |
| 4,722,488 | 2/1988 | Kubo | 242/532.1 |
| 4,770,359 | 9/1988 | Kiuchi | 242/526 |
| 4,836,464 | 6/1989 | Perego | 242/532.1 X |
| 5,221,404 | 6/1993 | Oya et al. | 242/526 X |

FOREIGN PATENT DOCUMENTS 0 210 844  2/1987  European Pat. Off. .

*Primary Examiner*—John Q. Nguyen
*Attorney, Agent, or Firm*—Frommer Lawrence & Haug, LLP

[57] ABSTRACT

A tape loading apparatus and method wherein a cassette previously loaded with waste tape is engaged in a work station. A trailing section of the waste tape is extracted from a front opening of the cassette together with a second portion of a leader spliced thereto. The second portion of the leader is separated from the waste tape which is then connected to a previously discarded tape length which is susceptible of engagement with a winding fork upon the action of which all waste tape is extracted from the cassette. When extraction is over, a first portion of the leader is separated from the extracted waste tape and then spliced to a new use tape to be loaded into the cassette.

26 Claims, 7 Drawing Sheets

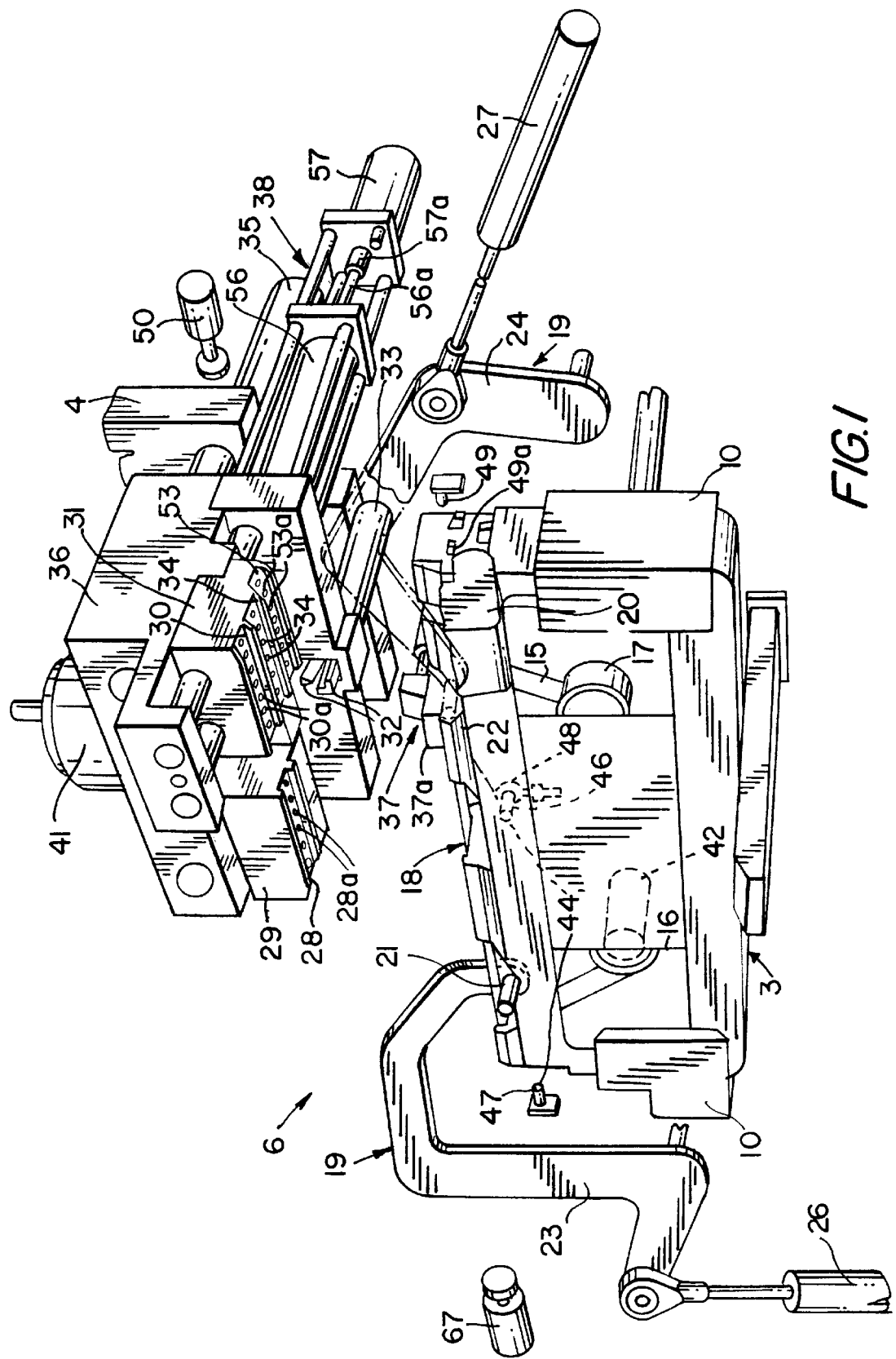

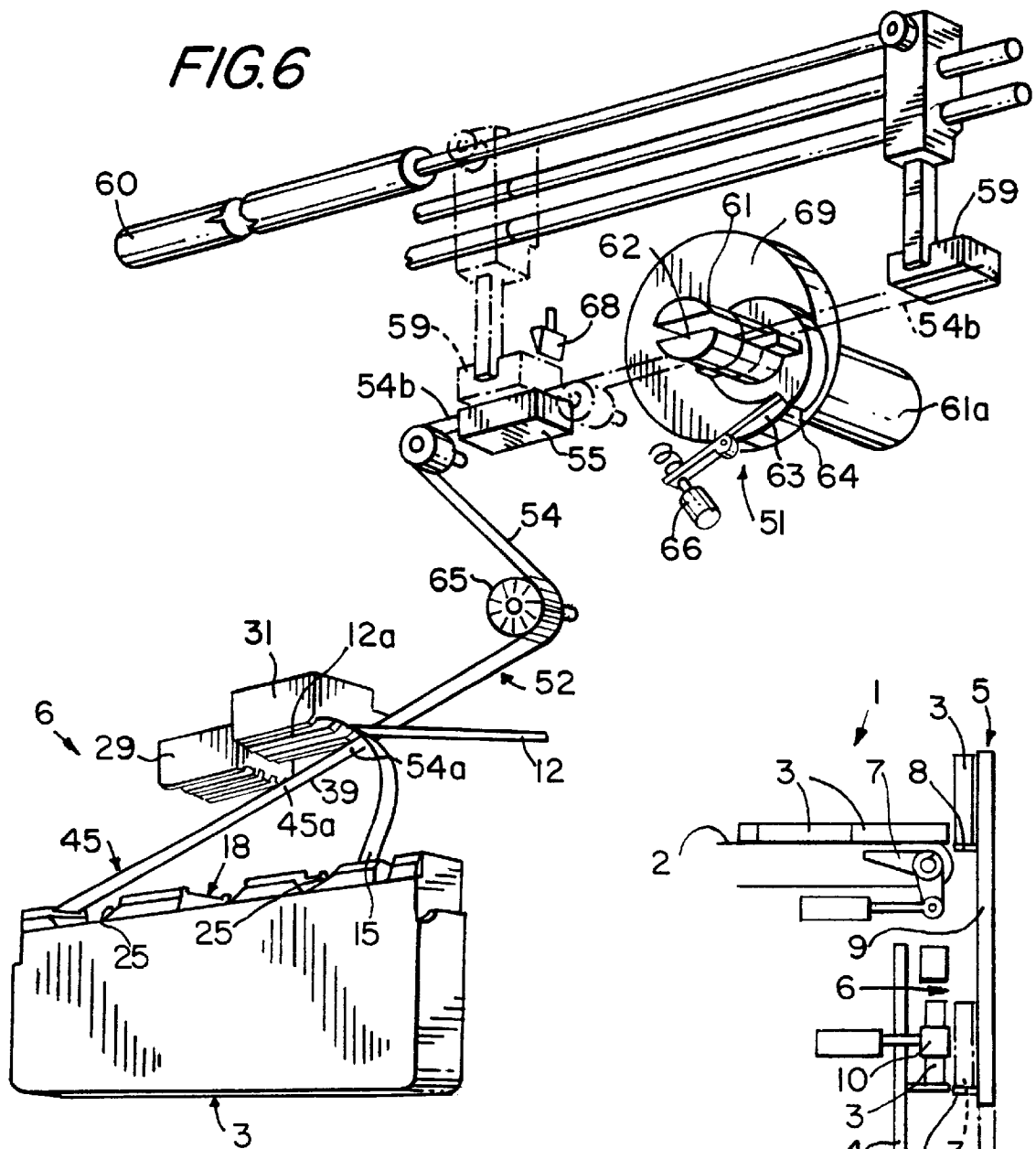
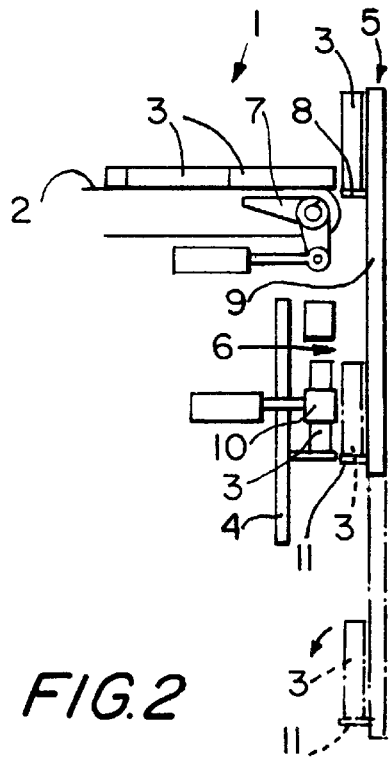
FIG.6
FIG.2

CASSETTE WASTE TAPE RELOADER

This application is a continuation of application Ser. No. 08/528,602, filed Sep. 15, 1995, abandoned, which is a continuation of Ser. No. 08/145,334 filed Oct. 29, 1993 abandoned.

FIELD OF THE INVENTION

The present invention relates generally to automatic cassette tape loading apparatuses and methods and more particularly to automatic cassette tape loading apparatuses and methods which permit the re-use of cassettes previously loaded with tape.

BACKGROUND OF THE INVENTION

The loading of magnetic tape into audio and/or video cassettes is typically carried out by appropriate cassette loading machines that, at each work cycle, pick up an empty cassette from an infeed conveyor and operatively engage it in a work station where it is loaded with magnetic tape (hereinafter referred to as "use tape") continuously fed from a supply reel or "pancake."

In greater detail, the cassette reaching the loading station contains a leader connected to both ends of the first and second winding hubs which are rotatably housed in the cassette.

Suitable extractor means carry out the extraction of the leader from a front opening provided in the cassette and place it onto an engagement surface on support blocks, said blocks being at least periodically aligned close to the front opening of the cassette.

Cutting means operate between the support blocks and cut the leader into a leading portion engaged to a first block and connected to the first winding hub and a second portion engaged to a second block and connected to the second winding hub.

By imparting a movement to the second block, a leading end of the use tape to be loaded is positioned in a second holding track molded in the second block. The use tape to be loaded is aligned with the first portion of the leader and subsequently spliced thereto through application of adhesive joining tape, upon the action of a splicing unit acting on the blocks.

The first winding hub rotates thereby causing a predetermined amount of use tape to be wound onto the cassette. When the winding is complete, the use tape still engaged to the support blocks is cut by said cutting means and, by displacing the second block again, the second portion of the leader is brought into alignment with the trailing end of the loaded use tape to which it is spliced. A further rotation of the first winding hub causes the end portion of the use tape and the second portion of the leader to be introduced into the cassette front opening, said cassette is then ejected from the loading station, while a new cassette to be processed takes its place.

With respect to the above explanation it is obvious that in the field of mass-produced loaded cassettes it is a relatively frequent occurrence for use tape loaded into a cassette to exhibit manufacturing defects, such as imperfect oxide coating of the tape.

In this case and others, e.g., when cassettes are loaded with defective recordings, the wrong length of tape, tape with oxide voids, or unwanted pre-recorded programs, the loaded cassette must be discarded. As a result, a substantial amount of cassettes are produced which must be discarded as waste products. This procedure involves a considerable loss of money due to both the costs of the cassettes and the use tape, which are thrown away. The cost for transporting these cassettes to disposal sites can also be large. Finally, disposal of these products as waste raises serious ecological concerns frequently resulting in the payment of heavy taxes.

SUMMARY OF THE INVENTION

An object of the present invention is to solve the above problems by a new loading process wherein it is possible to extract the waste tape from a loaded cassette in a very short period of time, making the cassette immediately available for loading with use tape again, without damaging the finished product.

In greater detail, the invention pertains to a cassette tape loading process which provides for utilizing cassettes previously loaded with tape ("waste tape"), wherein before the leading end of the use tape to be loaded is spliced to the first portion of the leader, the following steps are carried out: the second portion of the leader joined to a trailing section of the waste tape wound onto the first hub from the front opening of the cassette is extracted; the second portion of the leader is cut so as to separate it from the tape to be discarded; the trailing section of the waste tape is connected to auxiliary threading means operating outside the cassette; the waste tape from the first hub is unwound by means of the auxiliary threading means until the first portion of the leader is drawn out of the cassette opening; the first portion of the leader is then cut so as to separate it from a leading section of the waste tape extracted from the cassette; and the first portion of the leader is brought into alignment with the leading end of the use tape which is to be loaded. The loading process as described previously resumes, starting from the splicing of the use tape to the first portion of the leader.

In accordance with the invention, this process is put into practice by an apparatus characterized by auxiliary threading means which extracts waste tape wound onto a first hub from the cassette; and means for operatively connecting the auxiliary threading means with a trailing section of the waste tape previously separated from the second leader portion by said cutting means.

BRIEF DESCRIPTION OF THE DRAWINGS

Further features and advantages will become more apparent from the detailed description of the preferred embodiment of a cassette tape loading process which provides for reuse of cassettes previously loaded with waste tape, and an apparatus for putting the process into practice, in accordance with the present invention. The description is given hereinafter, by way of a non-limiting example, with reference to the accompanying drawings, in which:

FIG. 1 is a fragmentary perspective view of a work station of a machine for loading tape into cassettes, adapted to carry out the process of the present invention;

FIG. 2 is a diagrammatic vertical section of the machine, taken at the work station;

FIG. 6 is another perspective view of the cassette during the step in which the waste tape is extracted therefrom by auxiliary threading means.

DETAILED DESCRIPTION

Figure 3:
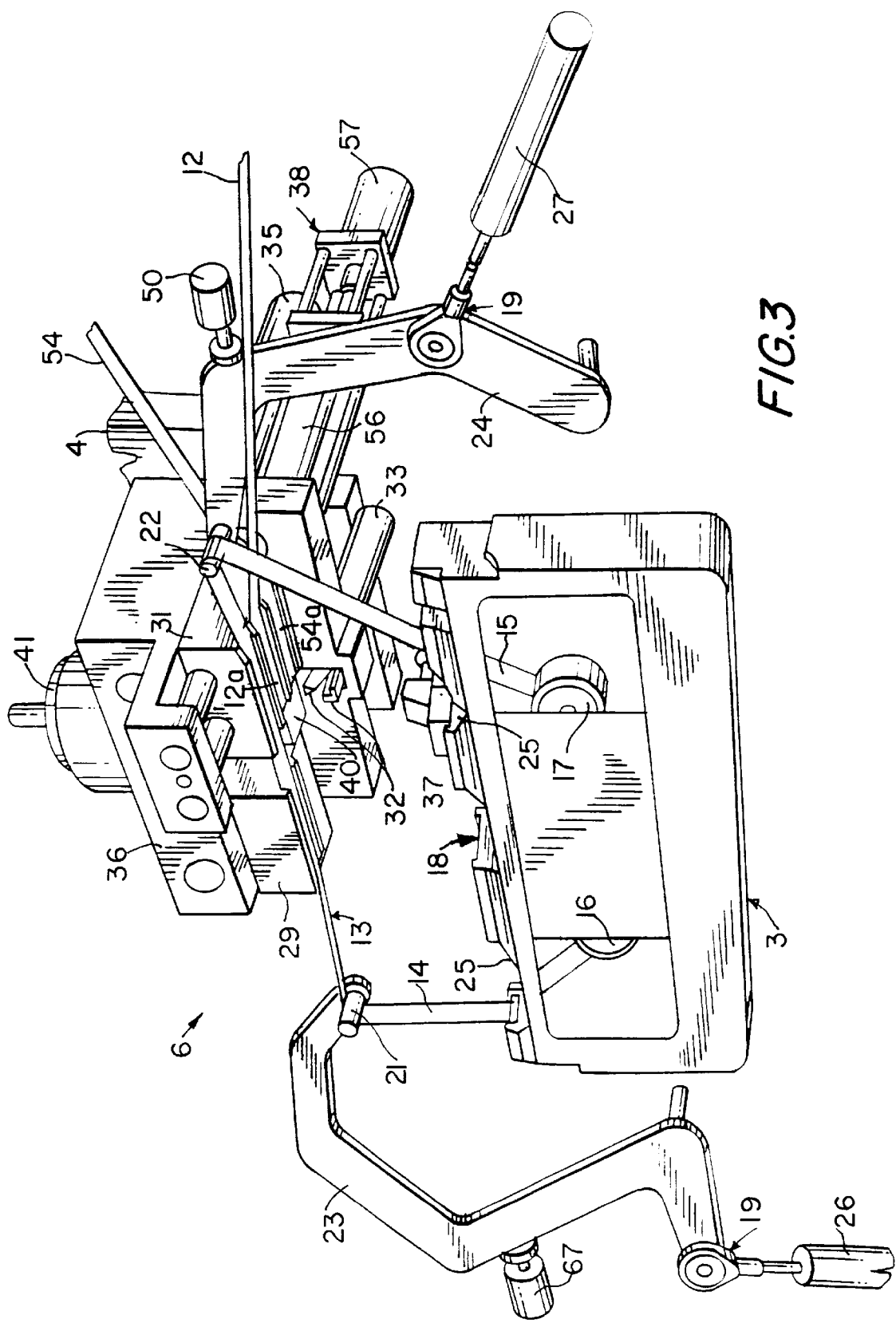
FIG. 3 is a diagrammatic front view showing a V-0 ("empty") cassette disposed in the work station, during the step of extracting the leader from the front opening thereof.

Referring particularly to FIGS. 1 and 2, reference number 1 generally denotes a cassette loading machine which employs a cassette tape loading process for reusing cassettes previously loaded with waste tape, in accordance with the present invention.

As shown in FIG. 2, the loading machine 1 provides for the use of a cassette feeding unit consisting of a belt conveyor 2 on which a plurality of cassettes 3 being processed are disposed, said cassettes being sequentially conveyed to a front panel 4 of the machine. Delivery means 5 pick up the individual cassettes 3 from the conveyor belt 2 and sequentially engage them in a work station 6 where each cassette undergoes the different operating steps for accomplishing the loading process. The delivery means 5 comprises an overturning device 7 that, at each operating cycle, picks up one cassette 3 from the end of the belt conveyor 2 and arranges it vertically on first support elements carried by a transferring member 9. The transferring member 9 is movable along vertical guides (not shown) between one position in which it receives the cassette 3 engaged by the overturning device 7, and a second position in which said cassette is engaged in a pair of side guides 10 that, following a displacement towards the front panel 4, cause the cassette to be operatively engaged in the work station 6.

The reception by the transferring member 9 of the cassette 3 engaged in the overturning device 7, and the engagement of a loaded cassette 3 on second support elements 11 carried by the transferring member occurs simultaneously. The loaded cassette 3 will then be moved away from the work station 6 simultaneously with lowering of the transferring member 9 to the second position and will be sent, to a collection conveyor not shown.

In the embodiment shown, the loading machine 1 is capable of carrying out the loading of empty audio or video cassettes (referred to as C-0 or V-0 cassettes) according to a conventional processing cycle which winds a predetermined amount of use tape 12 into a cassette, from a pancake which continuously supplies tape.

This processing cycle is described hereinafter to make the description easily understood.

As shown in FIG. 3, cassettes 3 reaching the work station 6 have a leader 13 comprising a first portion 14, and a second portion 15 respectively connected to first and second winding hubs, 16 and 17, rotatably housed in the cassette.

In the cassettes 3 the first and second portions, 14 and 15, of leader 13 form a single leader piece stretched before a front opening 18 of the cassette 3.

In the work station 6 provision is made for extraction means 19 to suitably extract the leader 13 from the front opening 18. The extraction means 19 preferably comprises first and second extractor elements 21, 22 attached to the ends of a first and second drive arm, 23, 24 respectively, and arranged to penetrate into corresponding access locations 25 provided close to the front opening 18 of the cassette 3, as soon as the cassette is operatively engaged in the work station 6. Each extractor element 21, 22 can be displaced, upon command of the main actuator 26, 27 acting on the corresponding drive arm 23, 24 between a rest position in which, as shown in FIG. 3, it is located at the outside of the front opening 18 of the cassette 3 to a predetermined distance therefrom.

As clearly shown in FIG. 3, after the empty cassette has been engaged in the work station 6, extractor elements 21, 22 are moved to the maximum-extracted position so that the leader 13 is extracted to a point above the cassette front opening 18.

In greater detail, the leader 13 is positioned on an engagement surface 28 exhibited by a first support block 29 and a first holding track or seat 30 disposed in alignment with the engagement surface 28 and exhibited by a second support block 31 positioned side by side with the first block 29. The engagement surface 28 and the first holding track 30 facing the cassette front opening 18 are designed to hold the leader 13 by a suction action produced through a plurality of holes 28a, 30a located in the surface of the track.

A first cutting means operates between the first and second blocks 29 and 31. It comprises a first cutter 32 operated by an actuator 33 that cuts the leader 13 in a transverse direction, so as to sever it into a first portion 14 and a second portion 15. When the cut has been executed, the first portion 14 extends between the first support block 29 and the first winding hub 16; the second portion 15 extends between the second support block 31 and the second winding hub 17.

At this point the first portion 14 of leader 13 must be connected to the use tape to load the use tape into the cassette 3. In greater detail, the use tape 12 has a leading end 12a engaged to the second block 31 at a second holding track or seat 34 which is parallel to the first holding track 30 which is also provided with respective suction holes 34a to hold the tape in place as described earlier.

Figure 12:
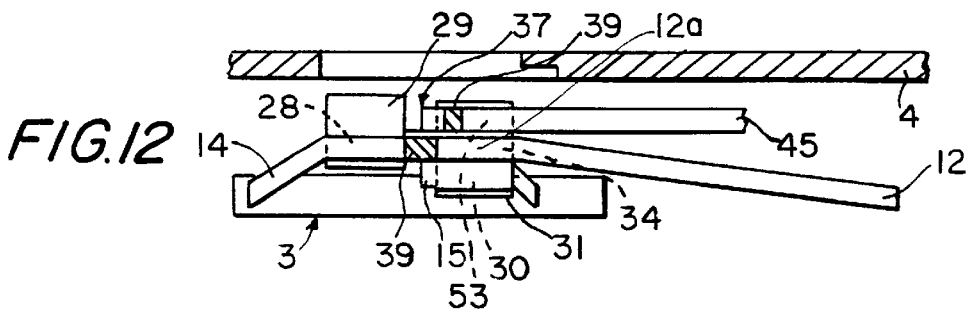
Figure 13:
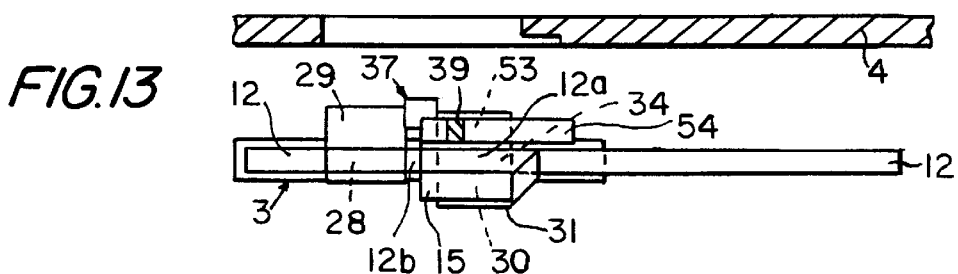
Figure 14:
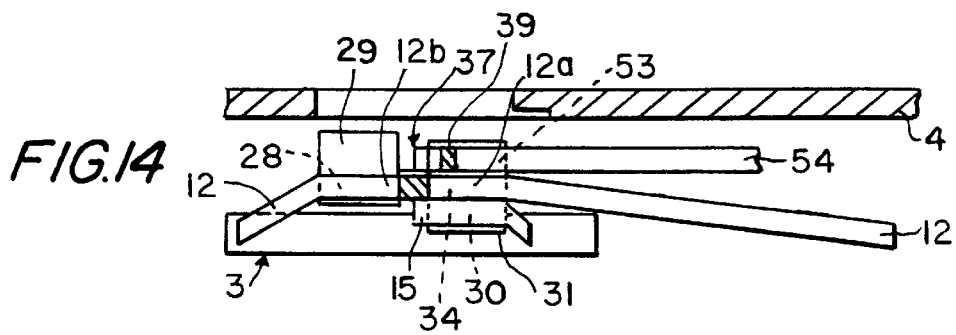

Upon return of the extractor members 21, 22 to the rest position, suitable displacement means consisting of a displacement actuator 35 acting on a frame 36 carrying both blocks 29, 31 causes the simultaneous displacement of the blocks from a first operating condition in which the engagement surface 28 and holding seat 34 aligned therewith are facing the front opening 18, to a second operating condition in which the engagement surface 28 and holding seat 34 aligned therewith are facing the front opening 18, to a third operating condition in which the engagement surface and holding seat are operatively located in front of a splicing unit 37 mounted to the front panel 4 at a laterally offset position with respect to the cassette 3. Simultaneously with this operation, upon the action of drive means 38, the second support block 31 is moved relative to the first support block 29 so that the second holding seat 34 is brought into alignment with the engagement surface 28 of the first block and, as a consequence, the leading end 12a of the use tape 12 to be loaded is brought into alignment with the first leader portion 14 (FIG. 12). The splicing unit 37, via an arm 37a movable towards the blocks 29, 31, applies a first adhesive joining tape 39 onto the ends of the first portion 14 of the leader and the leading part 12a of the tape, so as to join them. An abutment element 40, intermediate the blocks 29, 31, acts against the action of the arm 37a in order to ensure adhesion of the adhesive tape 39 to the leader 13 and use tape 12. This abutment element 40 is movable, upon command of a fluid-operated cylinder 41, in order to make room for the first cutting member 32 when it is operated.

Blocks 29, 30 are again brought to the first operating condition and, upon disengagement of the first portion 14 of the leader and the use tape to be loaded 12 by interruption of the suction effect on the engagement surface 28 and second holding track 34, the first winding hub 16 is driven in rotation upon the action of a winding spindle 42 (FIG. 1) so as to cause the winding of a predetermined amount of use tape 12.

When the desired amount of use tape 12 has been wound onto the hub 16, the tape is engaged on the engagement surface 28 of the second holding track 34 of blocks 29, 31 by a new displacement of the extractor element to the maximum-extracted position. The use tape 12 is then cut by the first cutter 32. The blocks 29, 31, upon returning of the extractor elements 21, 22 to the rest position, are brought to the second operating condition. Simultaneously with this operation, the second block 31 is moved relative to the first block 29 so as to bring the second leader portion 15 into alignment with the trailing end 12b of the tape 12 held on the engagement surface 28.

Figure 15:
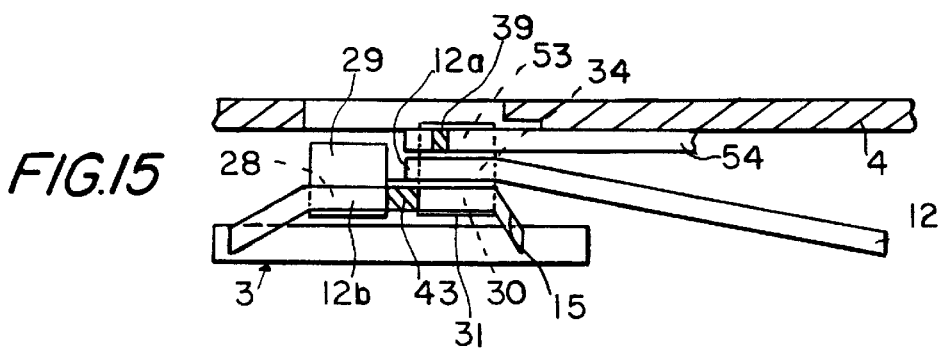

Then the splicing unit 37 applies another piece of adhesive joining tape 43 (FIG. 15) to join the trailing end 12b of the use tape and the second portion 15 of the leader.

The cassette loading process is completed by again driving the first winding hub 16 in rotation, to make the tape 12 and the second portion of leader 15 enter the cassette opening 18. The cassette is then released from the work station 6 and moved away by the transferring member 9. The leading end 12a of the use tape 12 is thereafter maintained on the second holding track 34 of the second block 31 until the next cassette is in condition for loading.

In accordance with the present invention, the loading machine 1 can also be used for removing "waste tape" to permit the reusing of previously loaded cassettes 3.

Cassettes 3, preloaded with waste tape 45, can be fed to the belt conveyor 2 by way of an up-feed conveyor (not shown). These preloaded cassettes can be fed, intermixed with standard, empty cassettes.

In accordance with the invention, in order to enable the apparatus 1 to differentiate between preloaded cassettes 3 from empty cassettes, sensor means 44 are associated with the work station 6, for detecting the presence of waste tape 45 within each cassette 3 engaged in the work station.

The sensor means 44 comprise at least one photoemitter 46 and one photoreceiver 47 located at the inside and outside respectively of the cassette 3 engaged in the work station 6. The photoemitter 46, upon engagement of the cassette 3 in the work station 6, enters a standard housing 48 arranged in the cassette and emits a light signal detectable by the first photoreceiver 47, through a standard aperture (not shown in the drawings) in the cassette.

In the absence of waste tape 45 in the cassette 3, the light signal passes through the first portion 14 of the leader to the first photoreceiver 47. Conversely, in the presence of waste tape 45 wound onto the first hub 16, the light signal is blocked, as the tape is not transparent and the first photoreceiver 47 receives no signal. This lack of a signal indicates the presence of waste tape 45 on the first hub 16.

A second photoreceiver 49 is located on the outside of the cassette, at a laterally opposite position relative to the first photoreceiver 47. This second photoreceiver 49 senses the light signal emitted from photoemitter 46 through a corresponding aperture 49a, in order to detect the presence of waste tape 45 wound onto the second hub 17, following the same modalities as previously described with reference to the first photoreceiver 47.

If both photoreceivers 47, 49 receive a signal from the photoemitter 46, a microprocessor (not shown) drives the loading machine 1 in operation according to the standard processing cycle described above in reference to the loading of empty cassettes.

Conversely, if the sensor means 44 detects the presence of waste tape 45 inside the new cassette 3 engaged in the work station 6, the microprocessor drives the execution of a new loading process for reuse of the previously loaded cassette 3.

If the second photoreceiver 49 detects the presence of waste tape 45 wound onto the second hub 17, it is possible to completely rewind the waste tape 45 onto the first hub itself or, alternatively, the cassette 3 can be directly disengaged from the work station to make room for a new cassette 3 being processed.

When the extractor elements 21, 22 leave their rest position, the second portion 15 of the leader and a trailing section 45a of the waste tape 45 are brought into engagement on the first holding track 30 of the second support block 31 and the engagement surface 28 of the first support block 29, respectively, the holding track and engagement surface being in mutual alignment.

Figure 4:
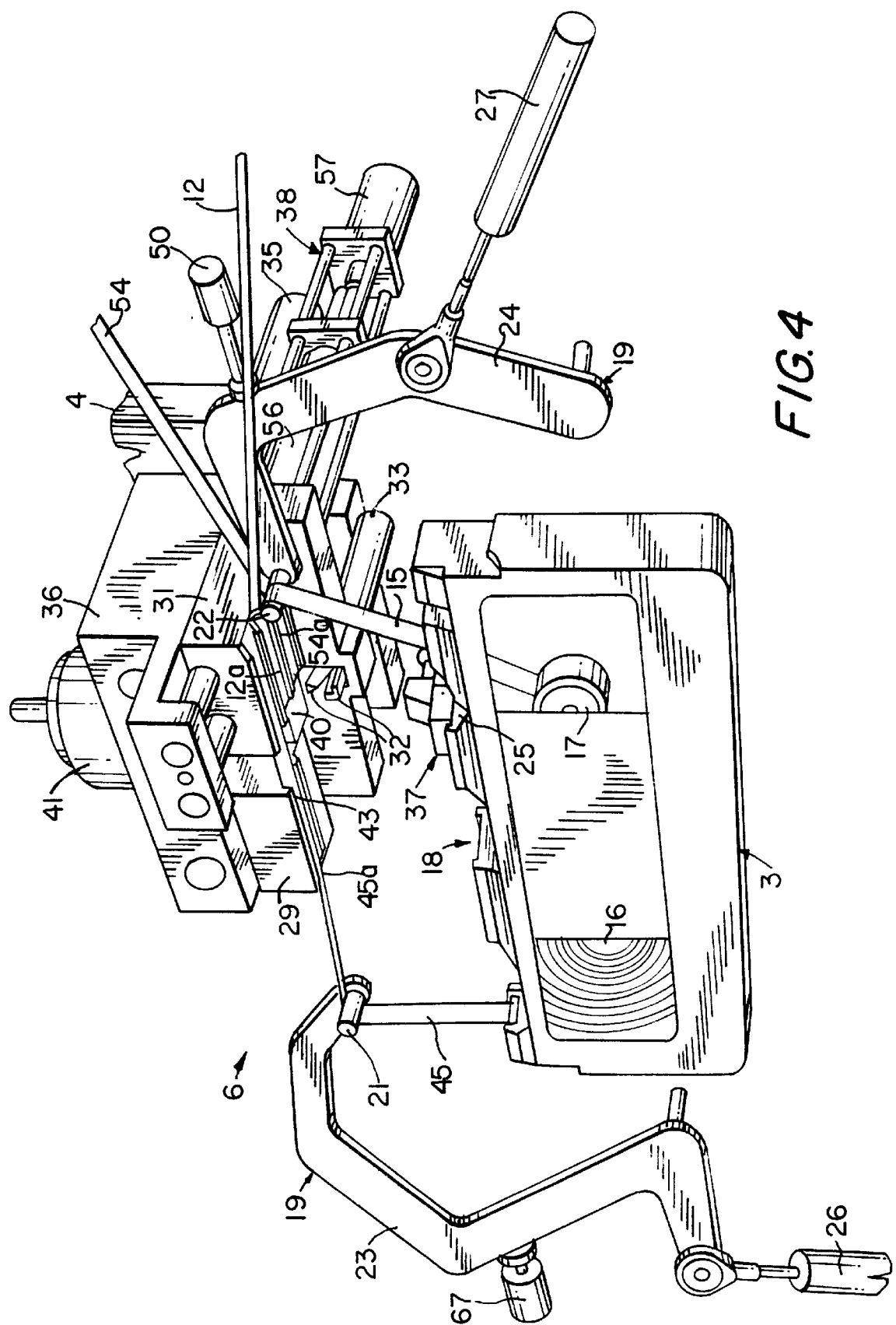
FIG. 4 shows a cassette previously loaded with waste tape, wherein a second leader portion is getting ready to be separated from the waste tape contained in the cassette.
Figure 7:
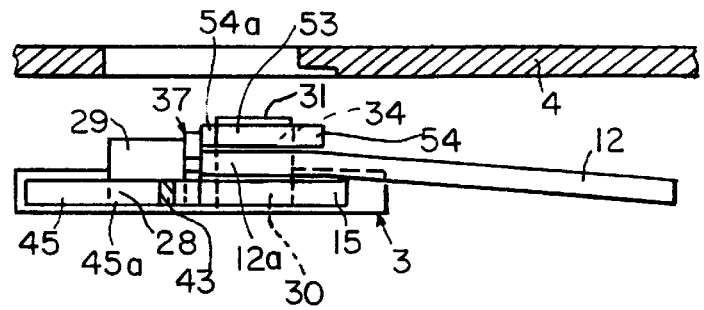
FIG. 7 to 16 diagrammatically show, in top views, the positions taken by the support blocks with respect to the cassette being processed, during the different steps of the process in question.

Simultaneously with this engagement step, the splice between the waste tape 45 and second portion 15 of the leader, represented by the second adhesive joining tape 43 applied in the processing cycle previously executed on the same cassette is advantageously positioned on the first block 29, in such a manner that it is laterally offset towards the first block, with respect to the direction of operation of the first cutting member 32 (FIGS. 4 and 7). This positioning of the splice is achieved by bringing the first extractor element 21 to the maximum-extracted position and simultaneously bringing the second extractor element 22 to an intermediate position between the rest position and the corresponding maximum-extracted position.

As shown in FIG. 4, the second extractor element 22 is stopped in an intermediate position by means of a first auxiliary actuator 50, which, when activated, impedes the displacement of the second drive arm 24 by working against the action of the corresponding main actuator 27.

Upon the action of the first cutting member 32, the second portion 15 of the leader is cut and completely cleared of the second adhesive joining tape 43, which remains attached to the trailing section 45a of the waste tape 45 held on the engagement surface 28 of the first block 29.

The trailing section 45a of the waste tape 45 can then be connected to auxiliary threading means 51 (FIG. 6) to take the waste tape completely out of the cassette 3.

In greater detail, the connection of the trailing section 45a of the waste tape 45 with the auxiliary threading means 51 is carried out by interconnecting means 52 which includes a third holding track or seat 53, located on the second block 31, parallel to the second holding track 34. The third holding track 53 holds an end portion 54a of a tape length 54 discarded in a previous processing cycle. The foremost portion 54b of tape length 54 is engaged on a holding element 55 which is part of the auxiliary threading means 51. In the example shown, the holding element 55 comprises a fixed block having a support surface on which the foremost portion 54b of the tape length 54 is retained.

Figure 8:
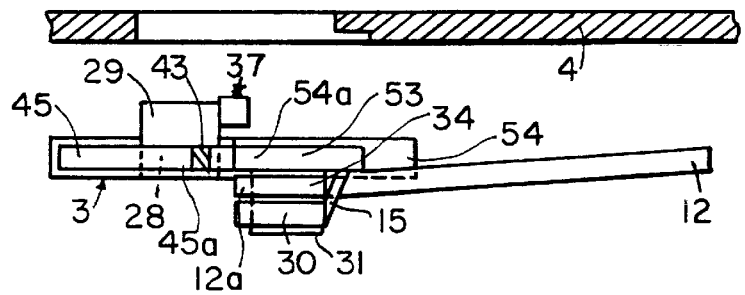

After cutting the second portion 15 of the leader and upon return of the extractor elements 21, 22 to the rest position, the second block 31 is moved with respect to the first block 29 so that the third holding track 53 carrying the end portion 54a of length 54 is aligned with the engagement surface 28 holding the trailing section 45a of the waste tape 45 (FIG. 8).

In accordance with a further feature of the present invention, in order to enable the first, second and third holding tracks 30, 34, 54 to be selectively brought into alignment with the engagement surface 28, the drive means 38 comprises a first movement actuator 56, the rod 56a of which (only partly shown in the drawings) acts on the second block 31 so as to move it from a first position in which the first holding track 30 is in alignment with the engagement surface 28, to a third position where the third holding track 53 is in alignment with the engagement surface 28. A second movement actuator 57 is fixed in succession to the first actuator 56. When activated, the second actuator acts, via rod 57a, against the rod 56a of the first actuator 56. This restrains the stroke of the second block 31 towards the third position, stopping it at a second position where the alignment of the second holding track 34 with the engagement surface 28 is achieved.

Figure 9:
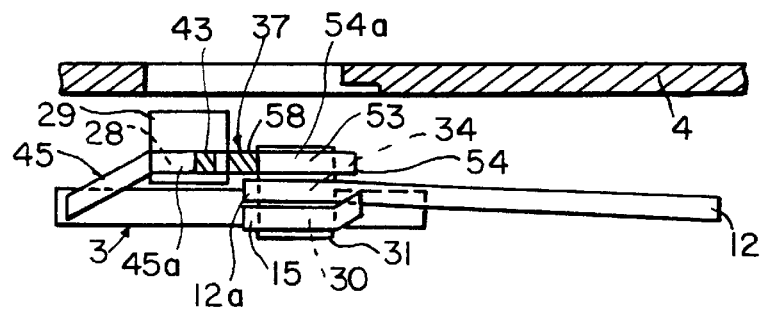

After the third holding track 53 has been brought into alignment with the engagement surface 28, the first and second blocks 29, 31 are brought to the second operating position and the splicing unit 37 carries out the splicing between the trailing section 45a of the waste tape 45 and the first end portion 54a of the tape length 54, by application of a third adhesive joining tape 58 (FIG. 9).

Blocks 29, 31 are brought back to the first operating position and, upon disengagement of the waste tape 45 and tape length 54 from said blocks by interruption of the suction effect, the extraction of the waste tape 45 from the cassette 3 is initiated by the action of the auxiliary threading means 51.

The auxiliary threading means 51 comprise a gripper element 59 controlled by a fluid-operated displacement cylinder 60. The gripper element is movable between a first position in which it is disposed close to the holding element 55 for picking up the foremost portion 54b of length 54, and a second position in which it is moved away from the holding element 55 so that it can extend the tape length 54 in a predetermined direction.

A winding fork 61 operates on the length portion 54 extending between the holding element 55 and gripper element 59 moved to the second position. The fork is movable perpendicularly to the movement of the gripper element 59 between a rest position in which it does not interfere with the movement of the gripper element, and an operating position in which, as shown in FIG. 6, it operatively engages the tape length 54 at a diametrical slit 62 provided in the fork itself. The orientation of the diametrical slit 62 is suitably fixed by a unidirectional ratchet pawl 63 capable of interfering with an abutment notch 64 carried on the periphery of fork 61, when the fork is driven in rotation by a motor 61a in a predetermined direction (clockwise with reference to FIG. 6).

Once engagement has occurred, the fork 61 is driven in rotation in a direction opposite to that causing the interference of the ratchet pawl 63 with the abutment notch 64 so that the fork carries out the threading and winding upon itself of the tape length 54 and waste tape 45 as it is drawn from the first hub 16.

A counter wheel 65 which is engaged in the path of the tape length 54 and waste tape 45 being unwound is driven in rotation at an angular speed proportional to the movement speed of the waste tape. When the difference between the angular speeds of the counter wheel 65 and first hub 16 detected by appropriate sensors reaches a predetermined value, the rotational speed of the winding fork 61 is reduced in order to prevent the leader 13 from being pulled away from the first hub 16, at the end of the waste tape 45 unwinding.

When unwinding is over, the leading section 45b of the waste tape 45 is extracted from the front opening 18 of the cassette 3 together with the first portion 14 of the leader.

The first extractor element 21 is moved from its rest position in order to cause the engagement of the first leader portion 14 and the leading section 45b of the waste tape 45 on the engagement surface 28 of the first block 29 and the third holding track 53 of the second block 31, respectively.

During this step, a portion of the waste tape 45 is required to be unwound from the winding fork 61. The fork thus must rotate in the opposite direction with respect to the winding direction. In order to avoid the rotation of the fork 61 being undesirably stopped, provision is made for a release actuator 66, acting on the unidirectional ratchet pawl 63, to move it to a position in which it does not interfere with the abutment notch 64 arranged in the fork.

Figure 5:
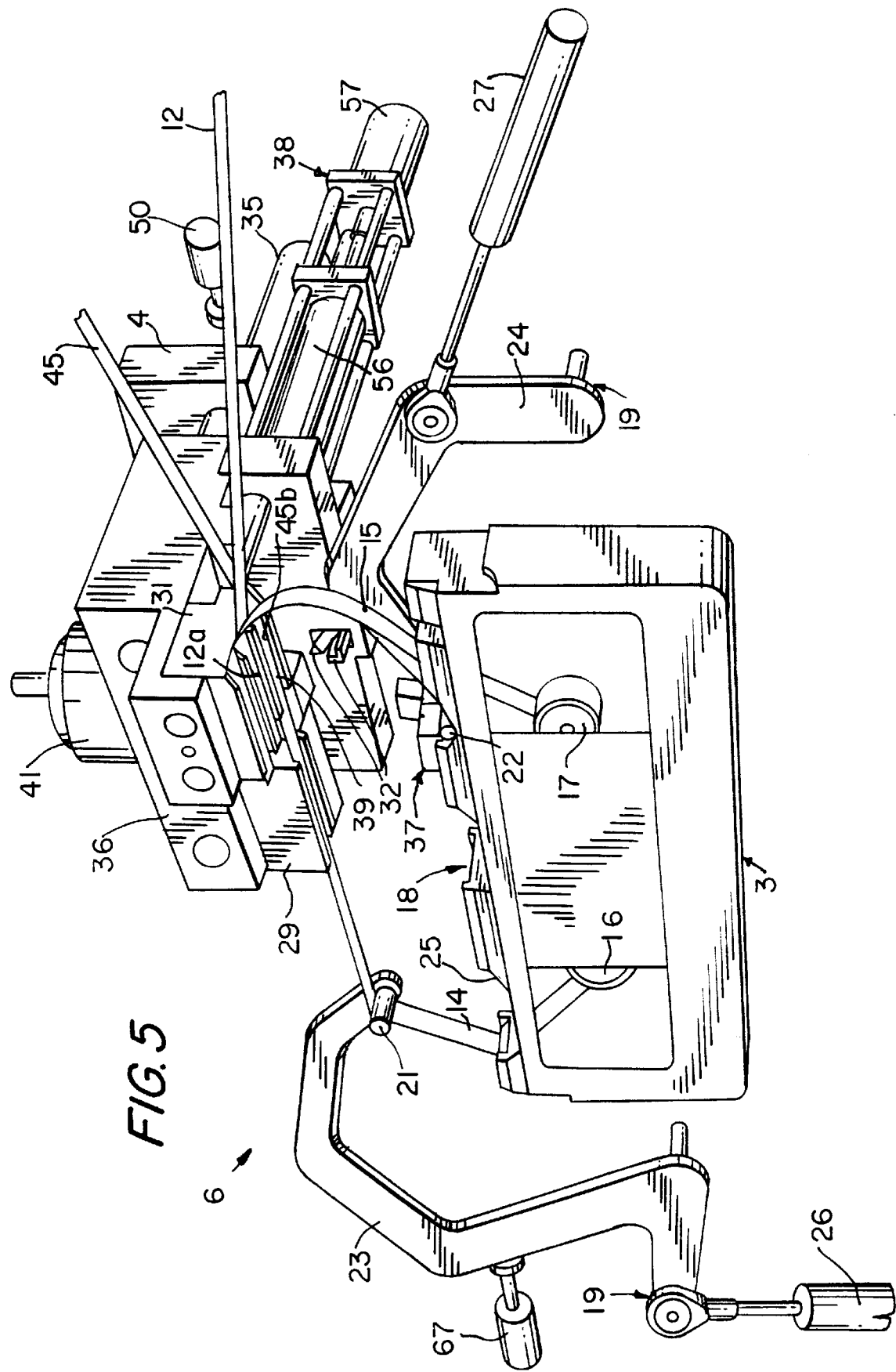
FIG. 5 shows the cassette of FIG. 4 during an operating step in which the waste tape extracted from the cassette is getting ready to be separated from a first leader portion.
Figure 10:
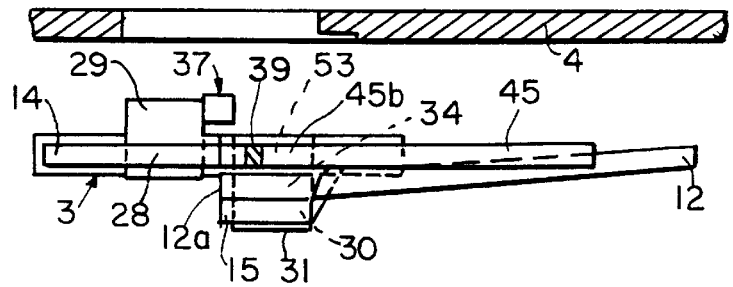
Figure 11:
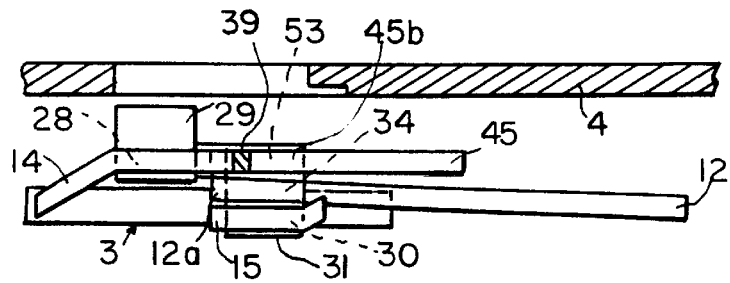

During the engagement of the first portion 14 of the leader and the leading section 45b of the waste tape 45 on blocks 29, 31, it is advantageously provided that the splice formed by the first adhesive joining tape 39 previously applied to said first leader portion and section, should be placed at a laterally offset position towards the second block 31 with respect to the other cutting direction, as shown in FIGS. 5 and 10.

To this end, during the shifting of the first extractor element 21 from the rest position, a second auxiliary actuator 67 (FIG. 5) is operated which is designed to act on the first drive arm 23 for stopping, against the action of the corresponding main actuator 26, the movement of the extractor element to a position intermediate the maximum-extracted position and rest position.

Subsequently the first cutting member 32 is operated to the first portion 14 of the leader. This completely separates it from the first adhesive tape 39, which is kept attached to the leader section 45b of the waste tape 45.

By operating the first and second movement actuators 56, 57 in combination, the second block 31 is moved to its second work position so that the second holding track 34 carrying the leading end 12a of the new use tape 12 is brought into alignment with the engagement surface 28 of the first block 29.

Figure 16:
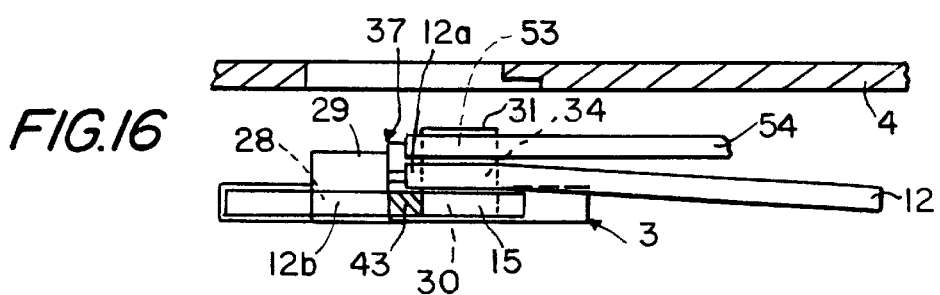

Then, the loading process continues following conventional modalities for loading empty cassettes starting from the step of splicing the first portion of leader 15 to the leading end 12a of the use tape 12 to be wound (see FIG. 16).

Meanwhile the waste tape 45 wound on the fork 61 is cut by an auxiliary cutter 68 at the holding element 55. This creates a new tape length 54 extending between the third holding track 53 of the second block 31 and the holding element itself. The waste tape roll 69 formed on fork 61 is dropped as a result of the backward movement of the fork to the rest position.

The method and apparatus of the present invention solves the majority of the problems connected with disposal of waste tape-loaded cassettes. In particular, all costs to be borne when waste products are to be deposited in disposal installations, as well as cost resulting from the necessity of stocking and periodically transferring important amounts of waste cassettes can be avoided. The intrinsic value of the recovered cassettes also represents a significant savings.

The method and apparatus of the present invention can be adapted to work with any type of apparatus used for loading empty cassettes. In fact, known loading machines can be modified in accordance with the present invention, by addition of the auxiliary threading means, up-feed conveyor means, interconnecting means and sensor means. Taking into account the construction complexity of loading machines, the addition of the above devices represents a modification of relatively easy accomplishment.

Although the present invention has been described with reference to a specific embodiment, it should not be construed as limited to the details disclosed herein, as the disclosed embodiment is merely illustrative of the invention.

I claim:

1. A cassette tape loading process providing for recovery of cassettes previously loaded with waste tape comprising the steps of:

engaging a cassette in a work station;

cutting a leader to produce first and second portions thereof with said first leader portion being supported on an engagement surface of a first support block and said second leader portion being supported in a first holding track of a second support block;

positioning said engagement surface of said first support block in alignment with a second holding track of said second support block which supports use tape thereon;

splicing a leading end of use tape to be loaded into said cassette to the first portion of the leader previously extracted from a front opening of the cassette and connected to a first winding hub arranged therein;

winding a desired amount of use tape to be loaded onto said first hub;

cutting said use tape loaded into the cassette thereby separating the trailing end of the wound tape from a new leading end of said use tape to be loaded in a subsequent work cycle;

aligning the trailing end of the tape loaded into the cassette with the second portion of the leader previously extracted from the cassette front opening and connected to a second winding hub arranged in the cassette by movement of the first and second support blocks to align the engagement surface of said first support block with the first holding track of said second support block;

splicing the trailing end of the tape loaded into the cassette to the second portion of the leader connected to the second winding hub;

winding up the spliced use tape and leader into the cassette and ejecting the loaded cassette from the work station, wherein before the step of splicing the leading end of the use tape to be loaded to the first leader portion, the following steps are carried out:

detecting the presence of waste tape in the cassette engaged in the work station;

extracting the second portion of the leader joined to a trailing section of a waste tape wound onto the first hub, from said front opening;

cutting the second portion of the leader so as to separate it from the waste tape;

positioning the separated waste tape on said engagement surface of said first support block;

aligning said engagement surface of said first holding track with a third holding track of said second support block supporting waste tape discarded in a previous operating cycle;

splicing the trailing section of the waste tape to an end portion of the previously discarded waste tape and connected to auxiliary threading means operating outside the cassette for automatically removing the waste tape from the cassette that has previously been spliced in between said first and second portions of the leader;

unwinding the waste tape from the first hub by means of said auxiliary threading means until the first portion of the leader is drawn from the cassette opening;

cutting the first portion of leader so as to separate it from a leading section of the waste tape drawn from the cassette;

aligning said engagement surface of the first support block supporting the first leader portion with the second holding track of said second support block to thereby bring the first leader portion into alignment with the leading end of the use tape to be loaded and resume the loading process starting from said step of splicing the use tape to the first portion of leader; and wherein only said first and second support blocks support said leader, use and waste tapes during cutting and splicing of same.

2. The process as claimed in claim 1, further comprising the following steps:

engaging, simultaneously with their being extracted from the cassette, the trailing section of the waste tape and second portion of the leader respectively on said engagement surface of the first support block and a first holding track in the second support block and disposed in alignment with said engagement surface, said first and second blocks, being located at opposite positions relative to the direction in which said cutting steps are carried out;

moving said blocks, with respect to each other after executing the cutting of a trailing portion of the leader, so as to align the waste tape with an end portion of the previously discarded waste tape and supported by the third holding track in the second block and operatively connected to said auxiliary threading means; and splicing the waste tape with the tape length previously discarded in order to carry out the step of connecting the waste tape to the auxiliary threading means.

3. The process as claimed in claim 2, further comprising the step of disengaging the waste tape and discarded tape length from said support blocks, before carrying out the step of unwinding the waste tape.

4. The process as claimed in claim 2, further comprising the steps of:

engaging the first portion of leader and the leading section of the unwound waste tape on the engagement surface of the first block and the third holding track of the second support block respectively, before carrying out the cutting of the first portion of leader; and moving the first and second support blocks, with respect to each other in order to align the first portion of leader with the leading end of the use tape to be loaded, carried by a second holding track in the second support block, before carrying out the step of splicing the use tape to be loaded to the first portion of leader.

5. The process as claimed in claim 4, and further comprising the steps of moving a first adhesive joining tape applied to the leading section of the waste tape and the first leader portion towards the second block simultaneously with a step of engaging the first portion of leader and the leading section of the waste tape on said blocks, and cutting said first portion of leader so that said first adhesive joining tape is only kept engaged to the leading section of the waste tape.

6. The process as claimed in claim 2, and further comprising the steps of moving a second adhesive joint tape applied to the waste tape and second leader portion towards the first block simultaneously with a step of engaging the trailing section of the waste tape and the second portion of leader on said blocks, and cutting said second portion of leader so that said second adhesive joining tape is only kept engaged to the trailing section of the waste tape.

7. The process as claimed in claim 1, further comprising the step of detecting the presence of waste tape wound on the first hub in order to enable the step of extracting the second portion of leader together with the trailing section of the waste tape.

8. The process as claimed in claim 7, further comprises the step of detecting the presence of waste tape wound on the second hub in order to enable a tape winding step for winding said waste tape on the first hub before the step of extracting the second portion of leader together with the trailing section of the waste tape.

9. A cassette tape loading process providing for recovery of cassettes previously loaded with waste tape, comprising the steps of:

engaging in a work station a cassette containing a waste tape having a leading section and a trailing section previously spliced by adhesive joining tapes respectively, between first and second portions of a leader engaged to first and second winding hubs, housed in the cassette;

extracting from a front opening of the cassette, the second leader portion together with the trailing section of the waste tape wound on the first hub of the cassette;

cutting the second leader portion in order to separate it from the trailing section of the waste tape and supporting the trailing section of the waste tape on an engagement surface of a first support block and the second leader portion on a first holding track of a second support block which also supports use tape in a second holding track thereof;

aligning said engagement surface of said first support block with a third holding track of said second support block supporting waste tape discarded in a previous operating cycle;

connecting the trailing section of the waste tape to an end portion of the previously discarded waste tape which is connected to auxiliary threading means operating outside of the cassette;

unwinding the waste tape from the first hub through the auxiliary threading means, until the first portion of leader together with the leading section of the waste tape has been extracted from the front opening of the cassette so as to thereby automatically remove waste tape from the cassette which has been previously sliced between the first and second portions of the leader;

supporting said first leader portion on the engagement surface of the first support block and the waste tape leading section on the third holding track of said second support block;

cutting the first portion of leader in order to separate it from the leading section of waste tape extracted from the cassette;

aligning said engagement surface of the first support block supporting the first leader portion with the second holding track of said second support block to thereby bring the first leader portion into alignment with a leading end of use tape to be loaded;

splicing the leading end of use tape to the leader first portion;

winding a desired amount of use tape to be loaded onto said first hub;

cutting said use tape loaded into the cassette thereby separating the trailing end of the wound tape from a new leading end of the use tape to be loaded in a subsequent work cycle;

aligning said engagement surface of said first support block with the first holding track of said second support block to align the trailing end of use tape loaded into the cassette with the second leader portion;

splicing the trailing end of the use tape to the second leader portion;

winding up the spliced use tape and leader into the cassette and electing the loaded cassette from the work stations; and wherein only said first and second support blocks support said leader, use and waste tapes during cutting and splicing of same.

10. A loading machine for loading tape cassettes, comprising:

at least one work station arranged to operatively engage a cassette being processed, containing at least one leader having a first portion and a second portion engaged to first and second winding hubs, respectively, located in the cassette itself;

extraction means for extracting the leader from a front opening of the cassette;

a first support block having an engagement surface facing the cassette front opening for receiving and engaging the first portion of leader extracted from the cassette;

a second support block located close to the first support block and having first, second and third holding tracks, disposed in side-by-side relation and facing the cassette front opening, said tracks being respectively arranged to receive and engage the second portion of leader extracted from the cassette, a leading end of a use tape to be loaded into the cassette, and an end portion of previously discarded waste type;

drive means acting on the first and second blocks, for selectively aligning the first, second and third holding tracks with said engagement surface;

cutting means operating between the blocks for separating the leading and trailing portions of the leader extracted from said front opening from each other, cutting the use tape loaded into the cassette and separating any waste tape detected between the first and second leader portions;

splicing means operating on the blocks for splicing the first portion of leader to the leading end of the use tape to be loaded, the second portion of leader to the trailing end of the use tape loaded into the cassette and the waste tape removed from the cassette to the end portion of the previously discarded waste tape;

wherein said machine further comprises:

detection means for detecting the presence of waste tape in the cassette engaged in the work station;

means for extracting the second portion of the leader joined to a trailing section of a waste tape wound onto the first hub, from said front opening;

means for cutting the second portion of the leader so as to separate it from the waste tape;

said engagement surface for positioning the separated waste tape thereon;

means for connecting the trailing section of the waste tape to an end portion of a tape length discarded in a previous operating cycle supported in said third holding track and connected to auxiliary threading means for automatically extracting waste tape which has been previously spliced between the first portion and second portion of the leader from the cassette; and said splicing means including means for engaging the trailing section of the waste tape previously separated from the second portion of leader with the end portion of said previously discarded waste tape supported in said third holding track of said second support block; and wherein only said first and second support blocks support said leader, use and waste tapes during cutting and splicing of same.

11. The machine as claimed in claim 10, wherein said third holding track is arranged to retain the end portion of the previously discarded waste tape the foremost portion thereof being engaged to the auxiliary threading means, said third holding track being aligned with the engagement surface of the first support block upon actuation of the drive means, in order to enable the trailing section of the waste tape to be spliced to the end portion of the previously discarded waste tape, upon the action of the splicing means.

12. The machine as claimed in claim 11, wherein said extraction means comprises first and second extractor elements, each of which is movable, upon command of a main actuator, between a rest position in which it is introduced into an access space formed in the cassette adjacent the front opening, and a maximum-extracted position in which it is spaced apart from, and external to the cassette front opening, at least one auxiliary actuator, for interrupting the stroke of the extractor element toward the maximum-extracted position and stop it at an intermediate position associated with each extractor element.

13. The machine as claimed in claim 11, wherein said third holding track is formed directly in the second block, side by side with the second holding track.

14. The machine as claimed in claim 13, wherein said drive means comprises:

a first actuator acting on the second support block for moving second support block it between a first position in which the first holding track is in alignment with the engagement surface of the first support block and a third position in which the third holding track is in alignment with the engagement surface; and a second actuator fastened to the first actuator and capable of activation for restraining the stroke of the second support block towards the third position and stop it to a second position in which the second holding track is aligned with the engagement surface.

15. The machine as claimed in claim 11, wherein said auxiliary threading means comprises:

a holding element designed to retain the foremost portion of the waste tape;

a gripper element movable between a first position in which it is disposed close to the holding element for picking up the foremost portion of the waste tape and a second position in which it is spaced apart from the holding element for extending the waste tape in a predetermined direction;

a winding fork movable between a rest position in which it does not interfere with the movements of the gripper element and an operating position in which it engages the waste tape extended by the gripper element, said fork being operable in rotation for threading and winding upon itself the waste tape together with the waste tape previously spliced to said waste tape.

16. The machine as claimed in claim 10, further comprises sensor means for detecting the presence of the waste tape in the cassette engaged in the work station.

17. The machine as claimed in claim 16, wherein said sensor means comprises at least one photoemitter and at least one photoreceiver being arranged to detect the presence of non-transparent waste tape wound onto the first hub.

18. The machine as claimed in claim 17, further comprising at least a second photoreceiver located externally of the cassette at an opposite position to the first photoreceiver and arranged to detect the presence of the waste tape wound onto the second hub.

19. A process of replacing tape in a previously loaded cassette, wherein said cassette comprises first and second hubs wherein said cassette has a length of waste tape wound on said hubs, spliced at a trailing section, at a first joint to a first portion of leader tape connected to said first hub and spliced at a leading section, at a second joint, to a second portion of leader tape connected to said second hub, comprising the steps of:

automatically extracting the waste tape from the cassette when the cassette is in a loading position such that said second joint is brought outside the cassette;

supporting said cassette waste tape on an engagement surface of a first support block and the second leader portion on a first holding track of a second support block which supports use tape on a second holding track thereof, cutting said extracted waste tape such that said second joint is severed from said second leader portion;

aligning said engagement surface of said first support block supporting said leading section of the waste tape containing said second joint with a third holding track of said second support block supporting an end portion of waste tape discarded in a previous operating cycle;

joining said leading section of the waste tape containing said second joint with said Previously discarded waste tape;

unwinding said waste tape wound on said hubs with an auxiliary threading means until said first joint is withdrawn from said cassette and said first leader portion is supported on the engagement surface of said first support block and the trailing end of said waste tape is supported on said third holding track of said second support block;

cutting said waste tape such that said first joint is severed from said first leader portion so as to remove the waste tape completely from the cassette that has been previously spliced to the first and second portions of the leader;

aligning said engagement surface of said first support block with the second holding track of said second support block so as to align said first leader portion with a leading end of use tape; splicing said first leader portion to said leading end of use tape;

winding a predetermined amount of use tape into said cassette;

cutting said use tape;

aligning the engagement surface of said first support block with the first holding track of said second support block to thereby align the trailing end of said use tape joined to said first portion of leader tape with said second portion of leader tape;

splicing said trailing end of use tape to said second leader portion;

winding up the spliced use tape and leader into the cassette and ejecting the loaded cassette from the waste station; and wherein only said first and second support blocks support said leader, use and waste tapes during cutting and splicing of same.

20. The process as claimed in claim 19, and further comprising the steps of moving a first adhesive joining tape applied to the leading section of the waste tape and the first leader portion towards the second block simultaneously with the step of engaging the first portion of leader and the trailing section of the waste tape on said blocks, and cutting said first portion of leader so that said first adhesive joining tape is only kept engaged to the trailing section of the waste tape.

21. A process as claimed in claim 19, further comprising the step of sensing the presence of waste tape in the cassette in the loading position on said first and/or second hub.

22. A process as claimed in claim 21, further comprising the step of winding all of said waste tape in the cassette onto said first hub in response to the detection of waste tape on said second hub.

23. A cassette tape loading process providing for recovery of cassettes previously loaded with waste tape comprising the steps of:

engaging a cassette in a work station; cutting a leader to produce first and second portions thereof;

splicing a leading end of use tape to be loaded into said cassette to the first portion of the leader previously extracted from a front opening of the cassette and connected to a first winding hub arranged therein;

winding a desired amount of use tape to be loaded, onto said first hub;

cutting said use tape loaded into the cassette thereby separating the trailing end of the wound tape from the leading end of said use tape to be loaded in a subsequent work cycle;

aligning the trailing end of the tape loaded into the cassette with a second portion of the leader previously extracted from the cassette front opening and connected to a second winding hub arranged in the cassette;

splicing the trailing end of the tape loaded into the cassette to the second portion of the leader connected to the second winding hub;

winding up the spliced tape and leader into the cassette and ejecting the loaded cassette from the work station, wherein before the step of splicing the leading end of the use tape to be loaded to the first leader portion, the following steps are carried out:

extracting the second portion of the leader joined to a trailing section of a waste tape wound onto the first hub, from said front opening;

cutting the second portion of the leader so as to separate it from the waste tape; connecting the trailing section of the waste tape to auxiliary threading means operating outside the cassette to automatically remove the waste tape from the cassette that has previously been spliced in between said first and second portions of the leader; unwinding the waste tape from the first hub by means of said auxiliary threading means until the first portion of the leader is drawn from the cassette opening; cutting the first portion of leader so as to separate it from a leading section of the waste tape drawn from the cassette;

bringing the first leader portion into alignment with the leading end of the use tape to be loaded and resume the loading process starting from said step of splicing the use tape to the first portion of leader;

engaging simultaneously with their being extracted from the cassette, the trailing section of the waste tape and second portion of the leader respectively on an engagement surface of a first support block and a first holding seat in a second support block and disposed in alignment with said engagement surface, said first and second blocks, being located at opposite positions relative to the direction in which said cutting steps are carried out; moving said blocks, with respect to each other after executing the cutting of a trailing portion of leader, so as to align the waste tape with an end portion of a tape length discarded in a previous operating cycle and supported by a third holding seat in the second block and operatively connected to said auxiliary threading means;

splicing the waste tape with the tape length previously discarded in order to carry out the step of connecting the waste tape to the auxiliary threading means.

24. The process as claimed in claim 23, further comprising the step of disengaging the waste tape and discarded tape length from said support blocks, before carrying out the step of unwinding the waste tape.

25. The process as claimed in claim 23, further comprising steps of:

engaging the first portion of leader and the leading section of the unwound waste tape on the engagement surface of the first block and the third holding seat of the second block respectively, before carrying out the cutting of the first portion of leader;

moving the first and second blocks, with respect to each other in order to align the first portion of leader with the leading end of the use tape to be loaded, carried by a second holding seat in the second block, before carrying out the step of splicing the use tape to be loaded to the first portion of the leader.

26. The process as claimed in claim 23, and further comprising the steps of moving a second adhesive joint tape applied to the waste tape and second leader portion towards the first block simultaneously with the step of engaging the trailing section of the waste tape and the second portion of leader on said blocks, and cutting said second portion of leader so that said second adhesive joining tape is only kept engaged to the trailing section of the waste tape.

* * * * *